US011792091B1

(12) United States Patent
Lilley

(10) Patent No.: US 11,792,091 B1
(45) Date of Patent: *Oct. 17, 2023

(54) RECONNECTION ROUTING FOR SERVICE SESSIONS

(71) Applicant: United Services Automobile Association (USAA), San Antonio, TX (US)

(72) Inventor: David Alexander Lilley, Schertz, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 442 days.

This patent is subject to a terminal disclaimer.

(21) Appl. No.: 17/158,513

(22) Filed: Jan. 26, 2021

Related U.S. Application Data

(63) Continuation of application No. 15/782,644, filed on Oct. 12, 2017, now Pat. No. 10,958,540.

(51) Int. Cl.
*H04L 41/5061* (2022.01)
*H04L 41/5022* (2022.01)
(Continued)

(52) U.S. Cl.
CPC ...... *H04L 41/5064* (2013.01); *H04L 41/5022* (2013.01); *H04L 67/306* (2013.01);
(Continued)

(58) Field of Classification Search
CPC ............ H04L 41/5064; H04L 41/5022; H04L 67/306; H04L 41/5003; H04L 41/5074;
(Continued)

(56) References Cited

U.S. PATENT DOCUMENTS 5,940,496 A 8/1999 Gisby et al.
6,094,673 A 7/2000 Dilip et al.
(Continued)

FOREIGN PATENT DOCUMENTS

GB 2524117 9/2015
WO WO 1997/18661 5/1997
(Continued)

OTHER PUBLICATIONS

EIC 3600 Search Report 102220 for U.S. Appl. No. 15/782,644, dated Oct. 22, 2020, 16 pages.
(Continued)

*Primary Examiner* — Florian M Zeender
*Assistant Examiner* — Karma A El-Chanti
(74) *Attorney, Agent, or Firm* — Fish & Richardson P.C.

(57) ABSTRACT

Techniques are described for routing service requests, in a service environment, based on a category of a previously terminated service session. A category is determined for a first service session involving an individual, the category being a topic, question, and/or problem discussed during the first service session. An activity record may be stored that identifies the individual and the category of the first service session. If the first service session is terminated, a reconnection dialog can be presented to request a reconnection. A second service request may be sent based on the selection through the reconnection dialog. Responsive to receiving the second service request, the activity record may be accessed and used to determine the category of the previous service session. The service request can then be automatically routed to a service representative suited to handle requests in that particular category.

17 Claims, 7 Drawing Sheets

(51) Int. Cl.
*H04M 3/523* (2006.01)
*H04L 67/306* (2022.01)
*G06Q 30/01* (2023.01)
*H04L 41/5003* (2022.01)
*G06Q 30/016* (2023.01)
*G06Q 10/10* (2023.01)
*H04L 41/5074* (2022.01)

(52) U.S. Cl.
CPC .......... *H04M 3/5233* (2013.01); *G06Q 10/10* (2013.01); *G06Q 30/01* (2013.01); *G06Q 30/016* (2013.01); *H04L 41/5003* (2013.01); *H04L 41/5074* (2013.01)

(58) Field of Classification Search
CPC ..... H04M 3/5233; G06Q 10/10; G06Q 30/01; G06Q 30/016
See application file for complete search history.

(56) References Cited

U.S. PATENT DOCUMENTS

| | | | |
|---|---|---|---|
| 6,138,139 | A | 10/2000 | Beck et al. |
| 6,385,644 | B1 | 5/2002 | Devine et al. |
| 7,698,566 | B1 | 4/2010 | Stone |
| 7,894,595 | B1 | 2/2011 | Wu et al. |
| 8,296,278 | B2 | 10/2012 | Abraham |
| 8,582,750 | B2 | 11/2013 | Lee et al. |
| 9,525,640 | B2 | 12/2016 | Ristock et al. |
| 10,958,540 | B1 | 3/2021 | Lilley |
| 11,223,540 | B1 | 1/2022 | Lilley |
| 2003/0131069 | A1 | 7/2003 | Lucovsky et al. |
| 2003/0131142 | A1 | 7/2003 | Horvitz et al. |
| 2004/0143523 | A1 | 7/2004 | Pegaz-Paquet et al. |
| 2006/0282328 | A1 | 12/2006 | Gerace et al. |
| 2007/0047720 | A1 | 3/2007 | Brandt et al. |
| 2008/0082463 | A1 | 4/2008 | Cheng et al. |
| 2008/0107255 | A1 | 5/2008 | Geva et al. |
| 2010/0057775 | A1 | 3/2010 | Wang et al. |
| 2010/0082391 | A1 | 4/2010 | Sorenson et al. |
| 2010/0138370 | A1 | 6/2010 | Wu et al. |
| 2010/0191658 | A1 | 7/2010 | Kannan et al. |
| 2011/0299676 | A1 | 12/2011 | Hanson et al. |
| 2012/0066120 | A1 | 3/2012 | Ringewald et al. |
| 2012/0173251 | A1 | 7/2012 | Gillin |
| 2012/0254325 | A1 | 10/2012 | Majeti et al. |
| 2013/0016823 | A1 | 1/2013 | Odinak et al. |
| 2013/0080539 | A1 | 3/2013 | Jan et al. |
| 2013/0144700 | A1 | 6/2013 | VanDeburg et al. |
| 2014/0052645 | A1 | 2/2014 | Hawes et al. |
| 2014/0079210 | A1 | 3/2014 | Kohler et al. |
| 2014/0164375 | A1 | 6/2014 | Persson et al. |
| 2014/0171034 | A1 | 6/2014 | Aleksin et al. |
| 2014/0211933 | A1 | 7/2014 | Vymenets et al. |
| 2015/0052260 | A1 | 2/2015 | Bott |
| 2016/0119477 | A1 | 4/2016 | Sharpe et al. |
| 2018/0096302 | A1* | 4/2018 | Tseretopoulos ......... H04L 63/08 |
| 2018/0121619 | A1 | 5/2018 | Perlroth et al. |
| 2019/0050239 | A1 | 2/2019 | Caldwell et al. |

FOREIGN PATENT DOCUMENTS

| | | |
|---|---|---|
| WO | WO 2002/071774 | 9/2002 |
| WO | WO 2003/010951 | 2/2003 |

OTHER PUBLICATIONS

EIC 3600 Refocus Search Report 110220 for U.S. Appl. No. 15/782,644, dated Nov. 2, 2020, 18 pages.

[No Author Listed] [online], "Matranet: MATRAnet addresses gap in customer relations, enabling companies to maximize web sales," M2Presswire, Jun. 9, 1999, retrieved on Nov. 4, 2021, retrieved from URL <https://dialog.proquest.conn/professional/docview/1080092729?accountid=131444>, 3 pages.

Koole et al., "An overview of routing and staffing algorithms in multi-skill customer contact centers," Department of Mathematics, Vrije Universiteit Amsterdam, 2006, 43 pages.

Tang et al., "Call-type classification and unsupervised training for the call center domain," 2003 IEEE Workshop on Automatic Speech Recognition and Understanding, 2003, pp. 204-208.

Peppard, "Customer relationship management (CRM) in financial services," European Management Journal, Jun. 1, 2000, 18(3):312-27.

* cited by examiner

RECONNECTION ROUTING FOR SERVICE SESSIONS

CROSS-REFERENCE TO RELATED APPLICATION

This application is a continuation application of and claims priority under 35 U.S.C. § 120 to U.S. application Ser. No. 15/782,644, filed on Oct. 12, 2017, which is related to U.S. patent application Ser. No. 15/782,603, titled "Predictive Routing for Service Sessions," filed on Oct. 12, 2017, the entirety of each of which is incorporated by reference into the present disclosure.

BACKGROUND

An organization may use any number of computing systems, communications networks, data storage devices, or other types of systems to provide services to individuals. An organization may also employ service representatives that use the various systems to assist individuals in service sessions that are conducted over the telephone, in a video conference, through text chat sessions, or over other communication channels. An organization may seek to optimize the manner in which incoming service requests are routed to service representatives to ensure optimal usage of computing resources and also to provide an appropriate level of responsiveness to the individuals.

SUMMARY

Implementations of the present disclosure are generally directed to routing requests in a service environment. More specifically, implementations are directed to routing of requests in a service environment to reconnect following a previously terminated service session, in which the routing of an individual's subsequent service request is based at least partly on the previous routing that was performed to establish the terminated service session.

In general, innovative aspects of the subject matter described in this specification can be embodied in methods that include operations of: initiating a first service session based on a first service request that is submitted by an individual in the service environment; storing, in an activity data store, an activity record that identifies the individual and a category associated with the first service session; receiving an alert indicating a termination of the first service session; and receiving an indication of a second service request that is submitted by the individual in the service environment after the termination of the first service session and, in response, retrieving the activity record from the activity data store, determining a service representative (SR) associated with the category indicated in the activity record, and initiating a second service session between the SR and the individual in the service environment.

Implementations can optionally include one or more of the following features: the service environment includes an interactive voice response (IVR) interface; the first service request is a call to the IVR interface; the category of the first service session is determined based on a navigation, through the IVR interface, to establish the first service session; the second service request is a call to the IVR interface; initiating the second service session includes bypassing at least a portion of the IVR interface; the activity record includes a telephone number of the individual; the activity record is retrieved that corresponds to the telephone number calling into the IVR interface; the activity record includes a time-to-live (TTL) value; the second service session is initiated based on determining that an elapsed time between the storing of the activity record and the receiving of the second service request has not exceeded the TTL value; the TTL value is based on the category; the operations further include detecting the termination of the first service session and, in response, sending an instruction to present a reconnection dialog on a user device of the individual; the second service request is sent from the user device in response to a selection made, by the individual, in the reconnection dialog; the operations further include selecting, from a category data store that includes a plurality of categories of service requests, the category associated with the first service session, wherein the activity record includes a category identifier that is a key to the category in the category data store; and/or the plurality of categories stored in the category data store includes a hierarchical arrangement of categories.

Other implementations of any of the above aspects include corresponding systems, apparatus, and computer programs that are configured to perform the actions of the methods, encoded on computer storage devices. The present disclosure also provides one or more computer-readable storage media coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and one or more computer-readable storage media coupled to the one or more processors having instructions stored thereon which, when executed by the one or more processors, cause the one or more processors to perform operations in accordance with implementations of the methods provided herein.

Implementations of the present disclosure provide the following technical advantages and/or technical improvements over previously available solutions. In traditional service environments, such as call centers, call routing may involve a number of administrators who determine which service representative is to receive and handle a particular call from a customer. Moreover, traditional call routing systems (either automatic or manual) may be prone to errors in which requests are misrouted, and subsequently require one or more rerouting operations to attempt to find the appropriate service representative to service a request. Implementations address these problems by determining a category for the service request, based on the category of a previously terminated service session, and automatically routing the request to a service representative who is suitable to handle the request of the predicted category. By providing for more accurate routing of requests, implementations do not consume the processing power, memory, and/or other computing resources that traditional systems consume to recover from errors in routing and/or re-routing of requests following an erroneous routing decision. Moreover, by providing a faster and more efficient mechanism for routing a service request following a terminated service session, by using information from the previous routing to expedite the reconnection routing, implementations avoid the expenditure of processing power, active memory, network bandwidth, storage space, and/or other computing resources that traditional systems are required to expend to re-determine the intent of the service request and route the service request. The expedited reconnection process described herein also provides a less frustrating and faster user experience for an individual reconnecting with a service environment following a previously interrupted service session.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
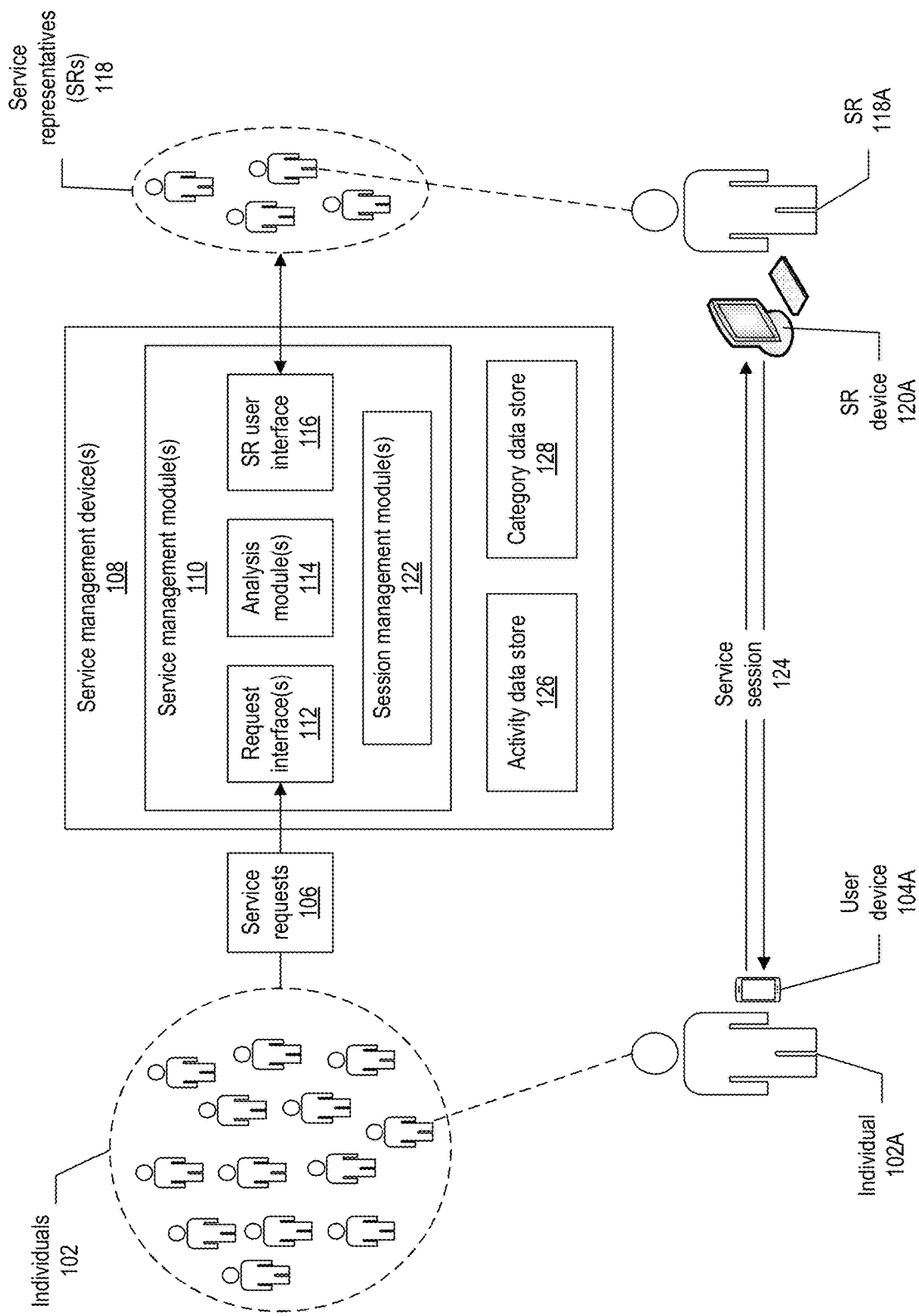
FIG. 1 depicts an example system for routing service requests in a service environment, according to implementations of the present disclosure.

Implementations of the present disclosure are directed to systems, devices, methods, and computer-readable media for routing service requests in a service environment such as a call center, online service portal, and so forth, the routing based on a category that was determined for a previously terminated service session. A category can be determined for a first service session involving an individual, the category being a topic of the service session and/or a question or problem that the individual is interested in. An activity record may be stored in an activity data store, the activity record identifying the individual and the category of the first service session. If the first service session is terminated, such as through a network failure, client device error, software exception, accidental user action, and/or other reasons, a reconnection dialog can be presented on the user device of the individual, to prompt the individual to request a reconnection. A second service request may be sent based on the individual's selection through the reconnection dialog. On subsequently receiving the second service request from the individual, the activity record may be accessed and used to determine that the individual has a service need corresponding to the category determined based on the previous service session. The service request can then be automatically routed to a SR who is suited to handle requests in that particular category, and a service session between the individual and the SR can be initiated. Accordingly, implementations employ the individual's actions to infer the individual's intent, and that intent is used to automatically route the service request according to the intent.

As described herein, a service session may include any number of communications between an individual (e.g., a customer) and a SR. In some examples, a service request (e.g., question, complaint, inquiry, etc.) may be submitted by an individual via a telephone call, a real-time chat session, text message, email, or other communications channel. The service request may be routed to a SR, and the SR may respond to the initial request with a voice response, text response, or otherwise. In some instances, the SR may respond to the service request through the same communication channel as that used by the individual to submit the service request. Accordingly, the service session may be conducted through the communication channel initially used by the individual. For example, the individual may call into a service center using their telephone, a voice over internet protocol (VOIP) application, or otherwise. The call may be routed to a particular SR, who may then conduct the service session with the individual using the telephone connection, VOIP connection, or otherwise. In other examples, the individual may contact a service center through video chat, instant messaging (IM), social media messaging, email, or through other communication channels, and the service session may be conducted through the initially selected communication channel. During the service session, the individual may submit any number of communications, and the SR may respond in turn. Accordingly, a service session may constitute a conversation between the individual and the SR that includes any number of communications sent between the parties, serially and/or in parallel, over any appropriate period of time. A service session may be conducted in real time as a conversation between the SR and the individual, such a telephone conversation, IM chat session, video chat session, VOIP conversation, and so forth. A service session may also be conducted through the exchange of communications that are not in real time, such as an exchange of email messages. A service session may also include the exchange of screen shots, images, audio files, video files, and/or other types of files or any other appropriate type of documents to facilitate the conversation between the SR and the individual.

FIG. 1 depicts an example system for routing service requests in a service environment, according to implementations of the present disclosure. As shown in the example of FIG. 1, a plurality of individuals 102 may each employ a user device 104 to generate a service request 106. The service requests may be communicated, over one or more networks, to one or more service management modules 110 executing on one or more service management devices 108 in a service environment.

The user device 104 may include any suitable type of computing device, such as a desktop computer, laptop computer, tablet computer, smartphone, wearable computer, and so forth. The computing device may be a portable computing device (e.g., smartphone, wearable computer) or a non-portable (or less readily portable) computing device. In examples where the individual 102 contacts the service environment through a telephone call, the user device 104 may be a telephone that may or may not also be a computing device. For example, the user device 104 may be a smartphone, or may be a traditional telephone that is not also a portable computing device. The service management device(s) 108 may include any suitable number and type of computing devices, such as server computers, distributed computing devices (e.g., cloud servers), network servers, network gateways, front end servers, back end servers, and so forth.

The service request 106 from an individual 102 may be received by one or more request interfaces 112 provided by the service management device(s) 108. As described above, implementations support various communication channels. The submission of a service request 106, and/or the particular request interface 112 that receives the service request 106, may vary based on the communication channel used by the individual 102 to send the service request 106. For example, an individual 102 may use a voice telephony network or data network to make a telephone and/or VOIP call to a call center. In such examples, the request interface 112 may enable the individual 102 may navigate through a sequence of audio menus and/or communicate with an interactive voice response (IVR) system to generate a service request 106 based on the individual's speech inputs and/or inputs through a telephone numeric keypad. As another example, an individual 102 may access a request interface 112 through an online application and/or web application to submit a service request 106 for a real time text chat session, video chat session, and/or audio chat session. In some instances, the individual 102 may send a service request 106 in the form of an email to an address associated with the service environment, and the request interface 112 may be configured to handle email communications arranged according to a version of internet message access protocol (IMAP), simple mail transfer protocol (SMTP), or some other protocol. In some instances, the individual 102 may send a service request 106 in the form of a text message to a phone number associated with the service environment, and the request interface 112 may be configured to handle text messages sent via a version of short message service (SMS), multimedia messaging service (MMS), and/or other suitable messaging protocol.

In any of these situations, and/or other types of service environments, the reconnection routing of the service request described herein enables the individual to bypass the default handling the service request, and be connected directly to an SR who is suitable to handle the individual's service request when the individual is attempting to reconnect to the service environment following a terminated session. For example, after the intent (category) of the individual is determined based on the individual's previous session, the individual may call into the IVR system of the service environment and, instead of going through the typical, default series of selections in the IVR tree, the individual may be routed directly to an SR who is available and appropriate for their particular category. In some instances, this routing may be performed after asking the individual to confirm that the predicted intent is the individual's actual intent, as described further below.

The request interface 112 may forward a service request 106 to one or more analysis modules 114 executing on the service management device(s) 108. The analysis module(s) 114 may analyze the service request 106 to determine a category for the service request 106, and determine a routing of the service request 106, e.g., identify an appropriate SR 118 to service the request 106 and engage with the requesting individual 102.

In some implementations, the service management device(s) 108 may provide a SR UI 116 that enables an SR 116 to interact with an individual 102 during a service session 124. The SR UI 116 may also be described as an SR portal, and may display information regarding the individual that the SR 116 is interacting with at any given time, such as the individual's name, ID number, category of intent or interest, products/services used by the individual 102, results of previous service sessions with the individual 102, and so forth. Any appropriate number of SRs 118 may be employed in, and/or available to service individuals, within the service environment, and routing a service request may include selecting a particular SR 118 from the pool of available SR(s), to handle the particular service request. One or more SRs 118 may each employ a SR device 120 to access the SR UI 116 and engage in service sessions 124 with individuals 102. The SR device 120 may be any appropriate type of computing device, such as a desktop computer, laptop computer, and so forth.

In response to a routing decision that selects a particular SR 118A to handle a service request from a particular individual 102A, as described herein, a service session 124 may be initiated to enable communications between the SR 118A and the individual 102A over the communication channel associated with the service request 106. The service session 124 may continue until one or both parties terminate the session, and/or until the individual's problem, question, or issue is resolved. In some implementations, the service management device(s) 108 may execute one or more session management modules 122 that initiate, terminate, and/or otherwise manage service sessions 124 between SRs 118 and individuals 102.

In some implementations, the request interface 112 and/or SR UI 116 may be respectively employed by the individual 102 and the SR 118 to communicate during the service session 124. For example, in instances where the service session 124 is conducted as an IM chat, video chat, and/or audio chat, the chat interfaces may be presented within the request interface 112 and/or SR UI 116. In instances where the service session 124 is conducted over a telephone network, the telephone conversation may take place independently of the interface(s) after the conversation is initiated. In such instances, the interface(s) may still be employed by the SR 118 and/or individual 102 to share screen shots, files, documents, or other information to facilitate the resolution of the problem, question, or issue. Alternatively, a telephone service session may be initiated through an interface that is an IVR system, and after the routing and initiation of the session, the session may proceed as a telephone conversation over telephone network(s) until one of the parties hangs up.

In some implementations, the service management device(s) 108 and/or SR device 120 may include functionality to record a service session 124. The recording may include an audio recording, video recording, a transcript of audio and/or video data, a transcript of text messages sent during the service session 124, and/or any other capture of information communicated between the SR 118 and the individual 102 during the service session 124. The recording may be stored on the service management device(s) 108, SR device 120, or elsewhere, and may be replayed or otherwise accessed by the SR 118. For example, in instances where the text transcript of a session is not clear, the SR 118 may refer to the audio recording for clarification.

Figure 2:
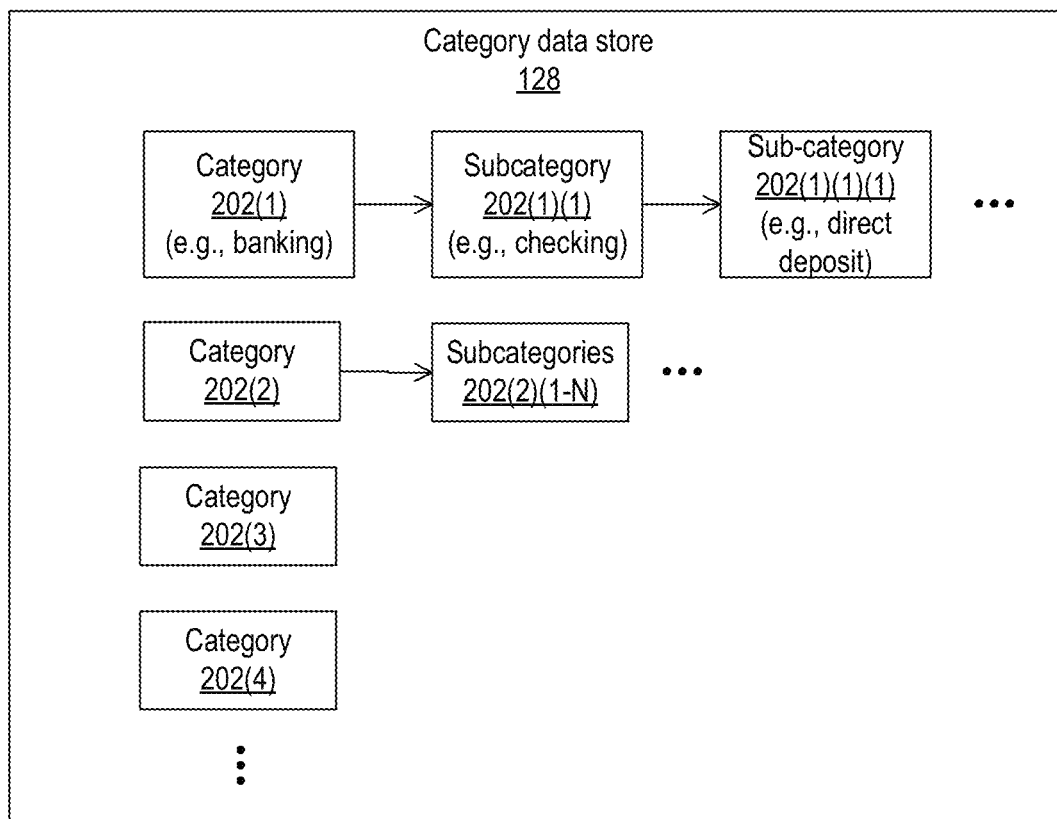
FIG. 2 depicts an example of category data, which may be employed for routing service requests in a service environment, according to implementations of the present disclosure.

FIG. 2 depicts an example of category data, stored in category data store 128, which may be employed for routing service requests in a service environment, according to implementations of the present disclosure. As shown in the example of FIG. 2, the category data can describe any number of categories 202. A category corresponds to a type, or a topic, of conversation that a SR may have with an individual (e.g., customer), and/or a type of question or problem that an individual may have for an SR. For example, if the service environment is provided to support customers of a financial services company, the categories 202 may include such topics as banking, investments, loans, and so forth. In some implementations, the categories 202 are arranged into a hierarchy of categories, such that a category 202 may include one or more sub-categories, a sub-category may itself include one or more sub-categories, and so forth. The hierarchy may include any suitable number of levels, in which each sub-category is more specific that the category that includes the sub-category. For example, a banking category may include sub-categories such as checking accounts, savings accounts, money market accounts, and so forth. A checking account sub-category may include other lower level sub-categories such as account balance, account transfer, direct deposit, transaction history, withdrawals, deposits, and so forth. In the example of FIG. 2, a category 202(1) includes a sub-category 202(1)(1), which includes a sub-category 202(1)(1)(1), and so forth. Each category may include any appropriate number of sub-categories, or zero sub-categories. Each sub-category may include any appropriate number of sub-categories, or zero sub-categories.

The categories may also be described as intents, given that each category can correspond to a particular intent of an individual who is submitting a service request. In some implementations, a category can correspond to a particular portion (e.g., page, frame, etc.) of an application and/or web site that the individual is accessing and performing action(s) in prior to submitting their service request. A category can also correspond to a particular SR, or group of SRs, that are available to handle service requests. For example, the categories can include a category for banking→checking→direct deposit, and the SRs 118 can include one or more SRs who are capable of handling service requests related to direct deposit questions and/or problems. Each category in the category data store 128 may be associated with a category ID that uniquely identifies the category among the various categories in the store 128, and the category ID may provide a key that is useable to search, retrieve, update, and/or otherwise access the category data in the store 128.

Figure 3:
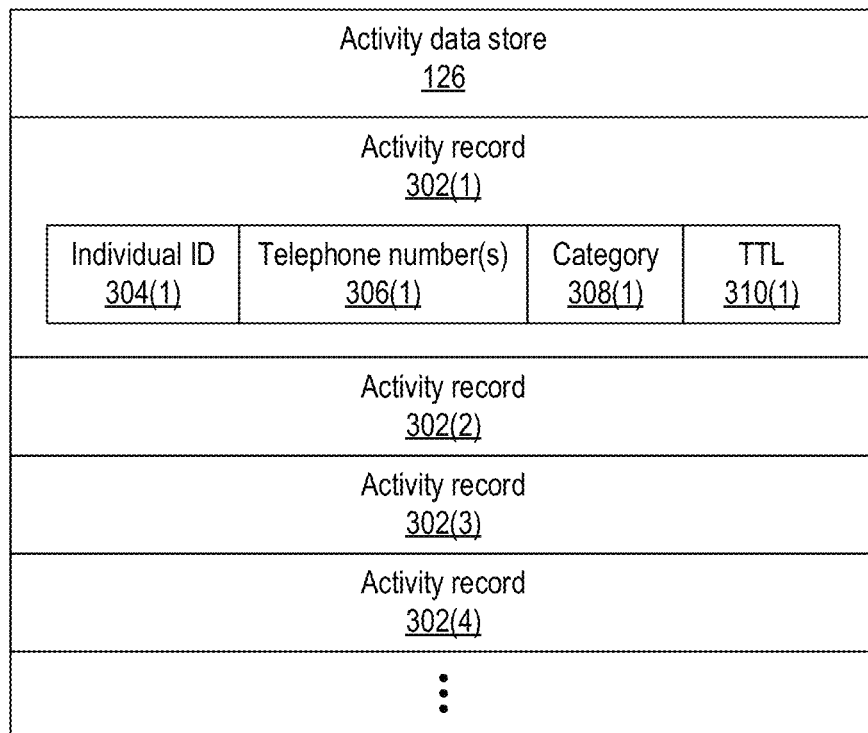
FIG. 3 depicts an example of activity data, which may be employed for routing service requests in a service environment, according to implementations of the present disclosure.

FIG. 3 depicts an example of activity data, stored in an activity data store 126, which may be employed for routing service requests in a service environment, according to implementations of the present disclosure. As shown in the example of FIG. 3, the activity data can include any suitable number of activity records that each associated an individual (e.g., customer) with a particular category (e.g., intent) that is determined based on the individual's action(s) in an application. An activity record 302 may include an individual ID 304 that provides a (e.g., unique) identifier of an individual 102, such as a customer ID number, member ID number, name, login, username, email address, and/or other type of identifier. The activity record 302 may include one or more telephone numbers 306 that have been registered with the service for the individual. The telephone numbers 306 may include numbers assigned to a telephone land line, a cell phone, a VOIP account, and so forth. The activity record 302 may include a category 308. In some implementations, the unique identifier (e.g., key) for a category 202 is stored in the activity record 302, as a foreign key into the category data store 128.

In some implementations, the activity record 302 may include a TTL value 310 that indicates how long the activity record is to remain useable and/or active. The TTL value 310 may be a timestamp (e.g., date and/or time) after which the activity record 302 is no longer useable for making routing decisions. For example, the TTL value 310 may be a pre-determine time period following the creation of the record 302, such as one day, one hour, one week, and so forth. In some implementations, the TTL value 310 may be based at least partly on the category 308 of the activity record 302. For example, an activity record 302 indicating an individual's intent to submit a service request regarding the category of account fraud may have a TTL value 310 of one day, whereas an activity record 302 indicating an individual's intent to submit a service request regarding the category of certificates of deposit (CDs) may have a TTL value 310 of one week. In some implementations, the TTL value 310 may take into account business hours, weekends, holidays, and/or other times when the service is, or is not, available. For example, a TTL value 310 may default to 48 hours from the time when an activity record 302 is created, but that 48 hours may be counted to include the hours that the service is available to handle requests, excluding weekends, holidays, and/or non-business daily hours (e.g., 6:00 p.m. through 8:00 a.m., etc.).

In some implementations, the activity record store 126 may be configured to store a single activity record 302 for an individual 102 at a time, e.g., and track only one intent for each individual at any given time. Alternatively, the activity record 126 may be configured to store any suitable number of activity records 302 for a particular individual 102 at any given time, to track multiple intents for the individual.

Figure 4:
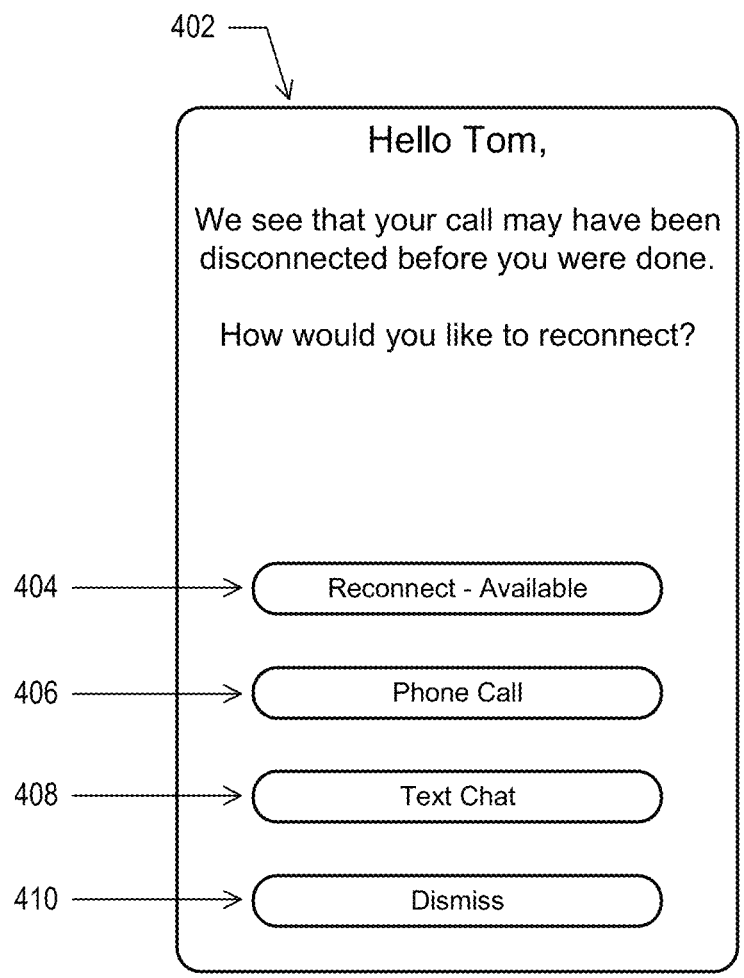
FIG. 4 depicts an example user interface for a reconnection dialog, according to implementations of the present disclosure.

FIG. 4 depicts an example of a UI, a reconnection dialog 402, for reconnection routing of service requests in a service environment, according to implementations of the present disclosure. The dialog 402 may be presented by an application executing on a user device 104. On detecting the termination of a service session with an individual, and/or on determining that the cause of the termination was due to an error, exception, or some other type of problem such that the termination was not deliberate by either of the participants in the service session, a signal may be sent to the individual's user device 104 to instruct an application on the user device 104 to present the reconnection dialog 402.

The dialog 402 indicates that the previous service session was terminated, and gives the individual various options for reconnecting with the service environment. In some implementations, the dialog 402 presents a control 404 that enables reconnection through a VOIP call and/or video chat session through the user device 104, if such functionality is available on the user device 104. In some implementations, the dialog 402 presents a control 406 that enables reconnection through a native dialer telephone, e.g., either using a traditional phone or a telephone application on the user device 104 to make a telephone call over a cellular network or land line network. In some implementations, the dialog 402 presents a control 408 that enables reconnection through a text chat session, using a chat client on the user device 104, if such functionality is available on the user device 104. The dialog 402 may also present a control 410 that allows the individual to dismiss the dialog 402 and return to other activities on the user device 104. Selecting any of controls 404, 406, or 408 may trigger the sending of a service request through the corresponding mode of communication. Various implementations may provide a dialog 402 that includes more, or fewer, reconnection options than those shown in the example of FIG. 4.

Figure 5A:
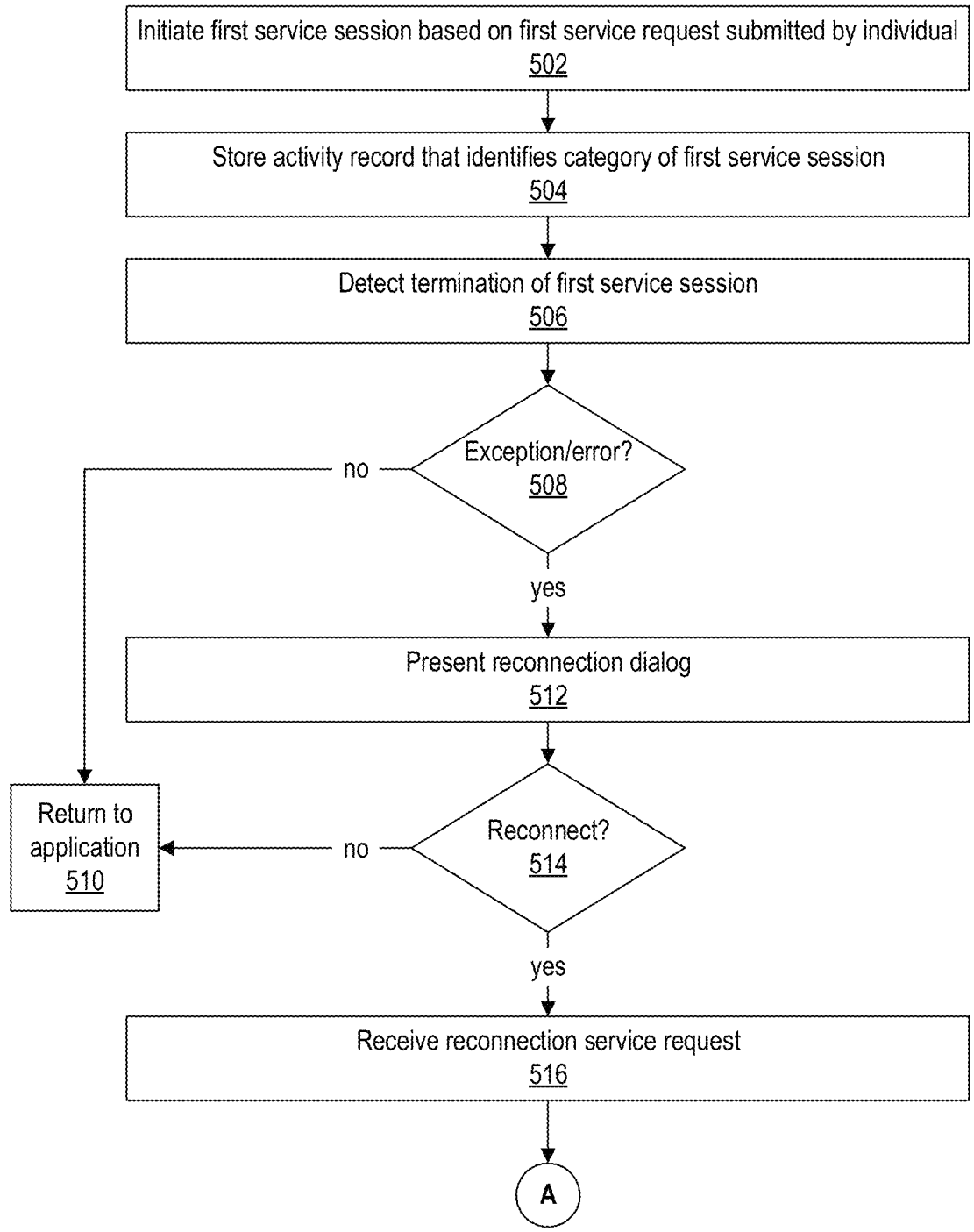
FIGS. 5A and 5B depict a flow diagram of an example process for routing service requests in a service environment, according to implementations of the present disclosure.
Figure 5B:
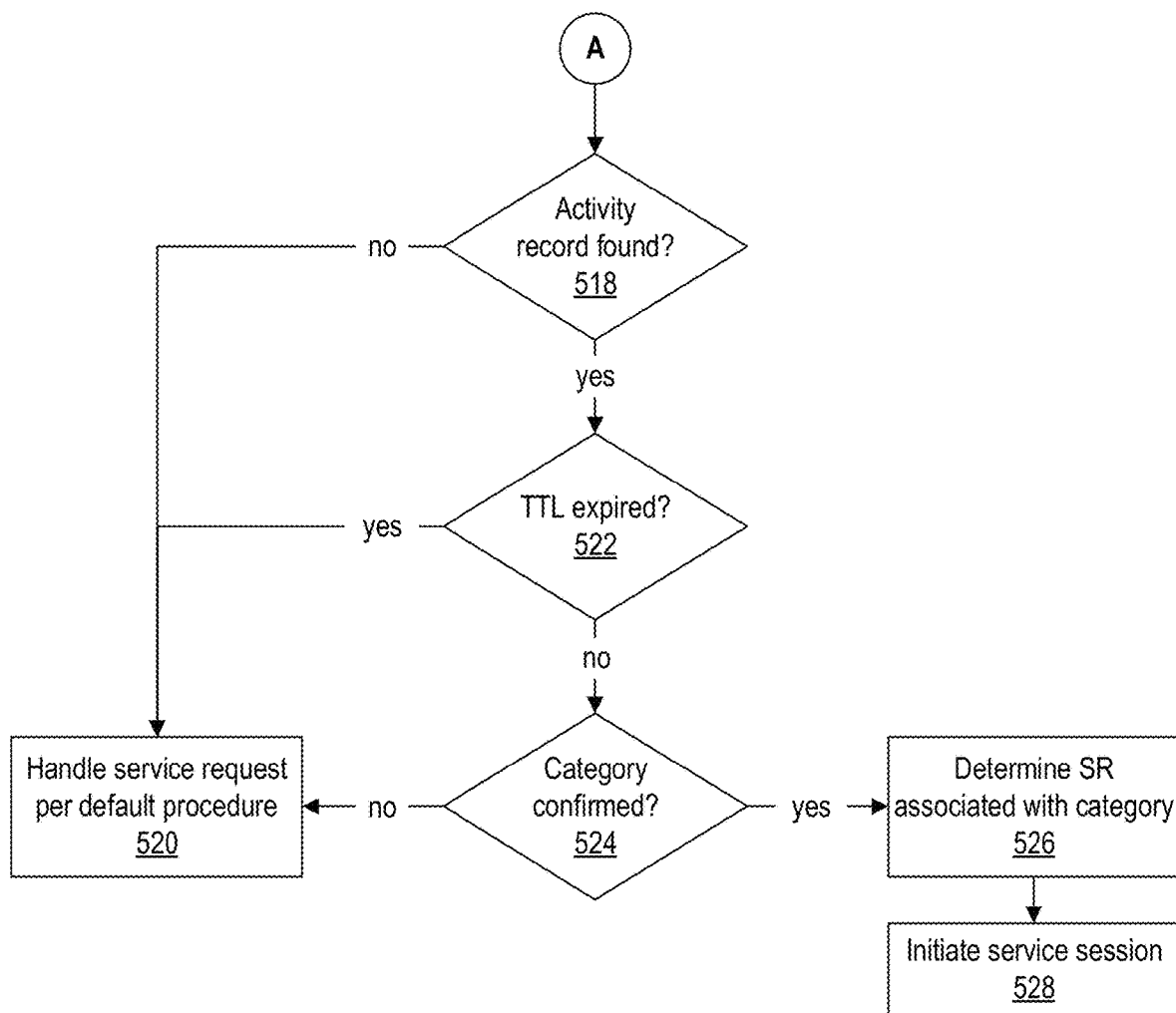

FIGS. 5A and 5B depict a flow diagram of an example process for routing service requests 106 in a service environment, according to implementations of the present disclosure. Operations of the process may be performed by one or more of the service management module(s) 110, the analysis module(s) 114, the session management module(s) 122, the SR UI 116, and/or other software module(s) executing on the user device 104, the service management device(s) 108, the SR device 120, or elsewhere.

With reference to FIG. 5A, a first service session is initiated (502) based on a first service request submitted by an individual in the service environment. A category may be determined for the first service session, corresponding to a topic of the session such as a question or problem that is being addressed by the SR for the individual during the session. In some implementations, the first service session is established through the individual's navigation of an IVR tree, in which the individual is asked various questions regarding the purpose of their call to the service environment. The category of the first service session may be determined based on an end result of that navigation through the tree, such as based on the lowest level (e.g., leaf) node of the tree where the individual navigated prior to the establishment of the first service session. The result of this navigation may be used to determine the routing of the first service request, i.e., to determine the particular SR to handle the first service request. Accordingly, the category of the first service session may also be determined based on the particular SR that was selected to handle the first service request. An activity record 302 is stored (504) in the activity data store 126, the record 302 identifying the individual 102 and the category of the first service session.

A termination of the first service session is detected (506). In some implementations, the termination is detected based on receiving an alert (e.g., signal and/or communication) indicating a termination of the first service session. The alert may indicate a failure of a communication channel that is carrying the first service session and/or that is carrying the communications between the individual and SR during the first service session. Accordingly, the alert may indicate a network failure, a failure of software and/or hardware on the user device, a failure of software and/or hardware on the user device, and so forth.

On detecting the termination of the first service session, a determination may be made (508) whether the termination was an exception, error, or some other inadvertent cause of termination, or whether the termination was intended by the individual 102 and/or the SR 118 involved in the first service session. If the termination was intended, the individual may be returned to the application (510) and/or otherwise continue with other activities on the user device 104.

If the termination was due to an error, exception, or some other type of failure, a signal may be sent to the user device 104 to cause an application on the user device 104 to present the reconnection dialog 402, as shown in FIG. 4. If the individual 102 selects (514) to dismiss the dialog 402, the operation is returned to the application or other functionality on the user device 104. If the individual 102 selects (514) to reconnect using one of the options presented in the reconnection dialog, a second (reconnection) service request may be sent from the user device 104. The reconnection service request is received (516). The process continues as described with reference to FIG. 5B.

In response to receiving the reconnection service request, the activity data store 126 is accessed and searched to determine whether one or more activity records 302 are stored that include the individual ID of the individual 102 who submitted the reconnection service request. In some instances, where the individual 102 submits the service request by calling into the service environment, e.g., to an IVR in the service environment, the individual's phone number may be used as key to search for any activity records for the individual in the activity data store 126.

If no activity record 302 is found for the individual (518) in the activity data store 126, the service request is handled per an appropriate default procedure (520). For example, if the service request is submitted to an IVR system, the default may be to place the caller at the top-level of the IVR query tree, and begin asking the caller what they are calling about, eventually asking enough questions to determine the caller's intent and then routing the request based on that intent.

If at least one activity record 302 is found for the individual (518), the activity record(s) 302 may be retrieved from the activity data store 126 and examined to determine if a TTL value is specified for the record(s) 302 and whether the TTL value has expired (522). If the TTL has expired for each of the record(s) 302 found, the service request 106 can be handled per the default procedure (520). Expiration of the TTL value, and the activity record, occurs in instances when the elapsed time between the storing of the activity record and the receiving of the service request exceeds the TTL value. In some implementations, a process may periodically run to remove, from the activity data store, activity records that include elapsed TTL values.

If at least one record 302 has an unexpired TTL value, in some implementations the individual may be asked to confirm (524) the category of the unexpired activity record 302 before proceeding with routing. For example, if an activity record 302 is found for the individual 102, with an unexpired TTL value, and with a category of money market account, the individual may be asked "are you still interested in talking about money market account?" If the individual responds negatively, and does not want to talk about the category, the service request 106 can be handled per the default procedure (520). In instances where multiple unexpired activity records 302 are found for the individual 102, e.g., in instances where multiple service sessions involving the individual may have been terminated unintentionally through error or exception, the individual 102 may be asked which topic they are calling about, e.g., "are you calling about your money market account, or your auto loan?" In this way, category confirmation can include determining a single category from multiple possible categories in which the individual has indicated an intent.

If the category is confirmed, a particular SR is determined (526) for routing the service request 106. The SR may be selected from the pool of SRs, as an SR who is currently available and able to service the request, and who is also suited (e.g., trained, specialized, knowledgeable, etc.) to handle the service request 106 in the particular category. The service session 124 may then be initiated (528) between the individual 102 and the selected SR 118.

In some instances, prior to or at the time of initiating the service session 124 between the individual 102 and the SR 118, the SR UI 116 (e.g., SR portal) may be populated with information regarding the individual 102, such as the individual's name, location, account(s) held, products used, service history, and/or other information regarding the individual being serviced.

The SR who services the individual during the first service session may be different than the SR who services the individual during the second service session. In some instances, the same SR may service the individual during both sessions, if the SR is still available when the reconnection service request is received. In situations where multiple service sessions with an individual are terminated unintentionally within a period of time, an inference may be made that the individual is having technical difficulties. In some implementations, in such circumstances, the service environment may task a particular SR with reaching out to the individual (e.g., through an outbound phone call or other channel), to ask if the individual needs technical assistance.

Figure 6:
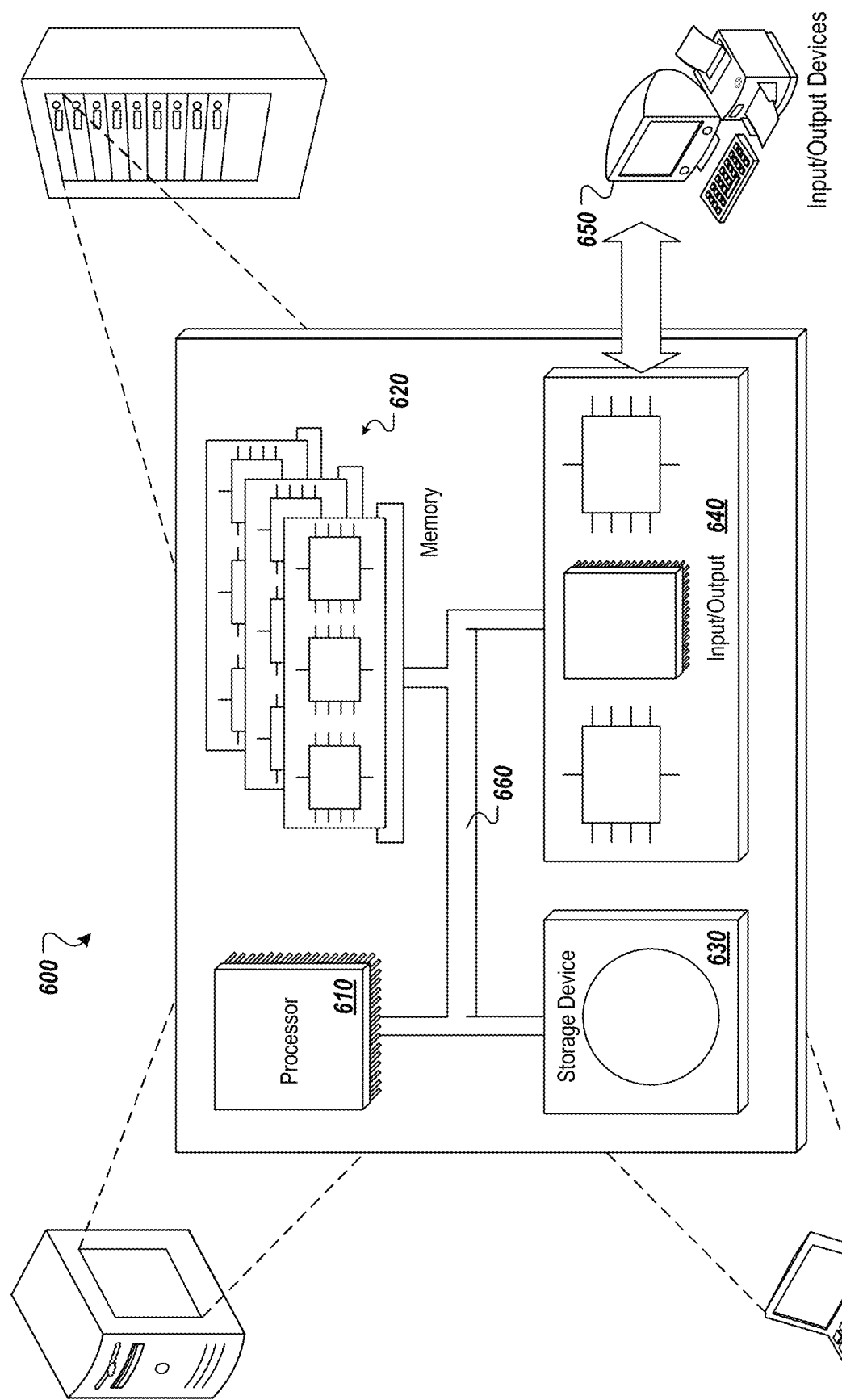
FIG. 6 depicts an example computing system, according to implementations of the present disclosure.

FIG. 6 depicts an example computing system 600, according to implementations of the present disclosure. The system 600 may be used for any of the operations described with respect to the various implementations discussed herein. For example, the system 600 may be included, at least in part, in one or more of the user device 104, the SR device 120, the service management device(s) 108, and/or other computing device(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for routing service requests in a service environment, the method performed by at least one processor, the method comprising:
   initiating, by the at least one processor, a first service session based on a first service request in the service environment;
   storing, by the at least one processor, an activity record that identifies an individual and a category of service request associated with the first service request;
   selecting a time-to-live (TTL) value from among multiple different time periods based on the category of service request associated with the first service session, each time period being associated with one or more different categories of service requests and storing the TTL value in the activity record, wherein the TTL value indicates how long the activity record is to remain active;
   detecting, by the at least one processor, termination of the first service session; and
   after the termination of the first service session, an option to reconnect is displayed on a user device of the individual and, in response to an indication that the individual selected to reconnect on the user device, a second service request is sent from the user device to the at least one processor and, in response:
   determining that an elapsed time between the storing of the activity record and receiving of the second service request has not exceeded the TTL value and, in response:
   initiating, by the at least one processor, a second service session with the individual in the service environment.

2. The method of claim 1, wherein the service environment includes an interactive voice response (IVR) interface.

3. The method of claim 2, wherein:
   the second service request is a call to the IVR interface; and
   initiating the second service session includes bypassing at least a portion of the IVR interface.

4. The method of claim 2, wherein:
   the activity record includes a telephone number of the individual; and
   the activity record is retrieved that corresponds to the telephone number calling into the IVR interface.

5. The method of claim 2, further comprising determining the category of service request associated with the first service session by determining a last node of the IVR interface that the individual navigated to prior to establishment of the first service session.

6. The method of claim 1, wherein a period of time indicated by the TTL value excludes non-business hours.

7. The method of claim 1,
   wherein the second service request includes data indicating a particular mode by which to reestablish a service session.

8. A system, comprising:
   at least one processor; and
   a memory communicatively coupled to the at least one processor, the memory storing instructions which, when executed by the at least one processor, cause the at least one processor to perform operations comprising:
   initiating, by the at least one processor, a first service session based on a first service request in a service environment;
   storing, by the at least one processor, an activity record that identifies an individual and a category of service request associated with the first service request;
   selecting a time-to-live (TTL) value from among multiple different time periods based on the category of service request associated with the first service session, each time period being associated with one or more different categories of service requests and storing the TTL value in the activity record, wherein the TTL value indicates how long the activity record is to remain active;
   detecting, by the at least one processor, termination of the first service session; and
   after the termination of the first service session, an option to reconnect is displayed on a user device of the individual and, in response to an indication that the individual selected to reconnect on the user device, a second service request is sent from the user device to the at least one processor and, in response:
   determining that an elapsed time between the storing of the activity record and receiving of the second service request has not exceeded the TTL value and, in response:
   initiating, by the at least one processor, a second service session with the individual in the service environment.

9. The system of claim 8, wherein the service environment includes an interactive voice response (IVR) interface.

10. The system of claim 9, wherein:
    the second service request is a call to the IVR interface; and
    initiating the second service session includes bypassing at least a portion of the IVR interface.

11. The system of claim 9, wherein:
    the activity record includes a telephone number of the individual; and
    the activity record is retrieved that corresponds to the telephone number calling into the IVR interface.

12. The system of claim 9, the operations further comprising determining the category of service request associated with the first service session by determining a last node of the IVR interface that the individual navigated to prior to establishment of the first service session.

13. The system of claim 8, wherein a period of time indicated by the TTL value excludes non-business hours.

14. The system of claim 8,
wherein the second service request includes data indicating a particular mode by which to reestablish a service session.

15. A computer-implemented method for routing service requests in a service environment, the method performed by at least one processor, the method comprising:
- initiating, by the at least one processor, a first service session based on a first service request in the service environment;
- storing, by the at least one processor, an activity record that identifies an individual and a category of service request associated with the first service request;
- selecting a time-to-live (TTL) value from among multiple different time periods based on the category of service request associated with the first service session, each time period being associated with one or more different categories of service requests and storing the TTL value in the activity record, wherein the TTL value indicates how long the activity record is to remain active;
- detecting, by the at least one processor, termination of the first service session; and
- after the termination of the first service session, an option to reconnect is displayed on a user device of the individual and, in response to an indication that the individual selected to reconnect on the user device, a second service request is sent from the user device to the at least one processor and, in response:
- retrieving, by the at least one processor, the activity record from an activity data store; and
- determining that an elapsed time between the storing of the activity record and receiving of the second service request has exceeded the TTL value and in response:
- assigning the second service request to queue of an interactive voice response (IVR) system.

16. The method of claim 15,
wherein the second service request includes data indicating a particular mode by which to reestablish a service session.

17. The method of claim 15, wherein a period of time indicated by the TTL value excludes non-business hours.

* * * * *